(No Model.)
A. W. GRANT.
ROLLER BEARING FOR VEHICLES.
No. 583,050. Patented May 25, 1897.
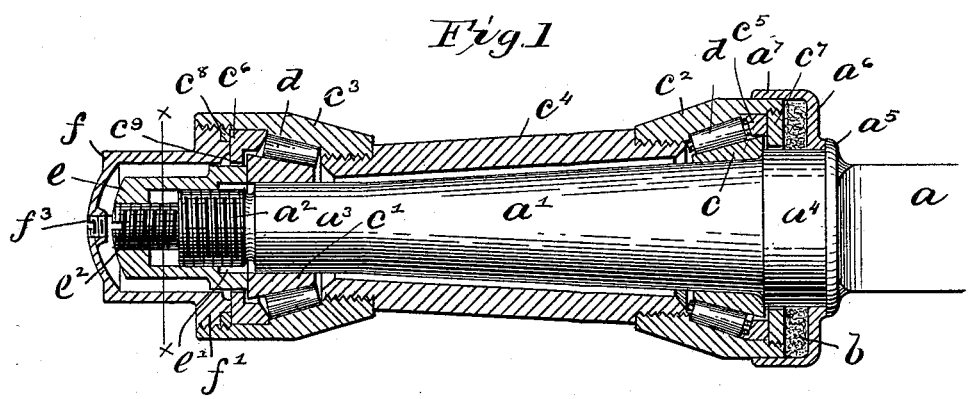
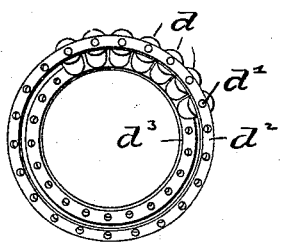
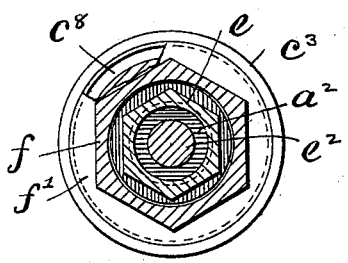
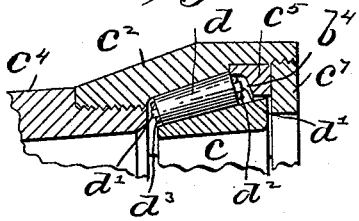
Witnesses
G. M. Gridley
Chas. J. Welch
Inventor
Arthur W. Grant
By his Attorney

UNITED STATES PATENT OFFICE.

ARTHUR W. GRANT, OF SPRINGFIELD, OHIO, ASSIGNOR TO THE RUBBER TIRE WHEEL COMPANY, OF SAME PLACE.

ROLLER-BEARING FOR VEHICLES.

SPECIFICATION forming part of Letters Patent No. 583,050, dated May 25, 1897.

Application filed March 5, 1897. Serial No. 626,111. (No model.)

*To all whom it may concern:*

Be it known that I, ARTHUR W. GRANT, a citizen of the United States, residing at Springfield, in the county of Clark and State of Ohio, have invented certain new and useful Improvements in Roller-Bearings for Vehicle-Wheels, of which the following is a specification.

My invention relates to improvements in roller-bearings for vehicles; and it consists in the constructions and combinations of parts hereinafter described, and set forth in the claims.

In the accompanying drawings, Figure 1 is a longitudinal sectional view of a hub of a vehicle or any wheel with the supporting-axle, shaft, or spindle. Fig. 2 is a transverse sectional view of a portion of the same, taken on the line $x$ $x$ in Fig. 1. Fig. 3 is a sectional view in detail of a portion of the same on an enlarged scale. Fig. 4 is an end elevation showing the arrangement of the antifriction-rollers as used in one form of the device.

Like parts are represented by similar letters of reference in the several views.

In the said drawings, $a$ represents the axle of an ordinary vehicle, and $a'$ the spindle thereof, which is formed at the outer end with a screw-threaded portion $a^2$ and immediately back of said screw-threaded portion with a smooth straight portion $a^3$. At the inner end of the spindle it is formed with a straight bearing or shouldered portion $a^4$, at the end of which is a flange or shoulder $a^5$. On this straight shouldered portion $a^4$ I shrink or otherwise secure a recessed collar $a^6$, having a laterally-projecting annular flange $a^7$, and within the recess formed by said flange I insert a felt washer $b$.

Extending rearwardly from the front smooth plain portion $a^3$ to the shouldered bearing $a^4$ the spindle is tapered, being of a gradually-increasing diameter from front to rear, and on this tapered portion there is fitted a conical sleeve $c$, which is preferably fitted accurately to said tapered portion, but adapted to contact at its end with the shouldered bearing $a^4$. On the straight portion $a^3$ there is placed a similar conical sleeve $c'$, the small diameters of these respective sleeves being toward each other. Surrounding each of these conical sleeves there is an outer hub or bearing-ring $c^2$ and $c^3$, and these outer bearing-rings are connected together by an intermediate tapered sleeve $c^4$, which is screwed into each of said bearing-rings, the ends of said sleeve $c^4$ being shouldered down and screw-threaded for this purpose. Each of these outer hubs or bearing-rings $c^2$ and $c^3$ is provided with an inclined bearing-surface which stands adjacent to the conical sleeves $c$ and $c'$, respectively, the inclination of this bearing-surface being such as to leave a tapered opening between said bearing-surface and the inner cone or sleeve, and within this space there is placed a series of tapered rollers $d$, the large ends of which stand opposite the large end of the inner cone or sleeve. Within each of these hubs or outer bearing-rings there is placed a retaining-ring $c^5$ and $c^6$, each of which is shouldered into said outer hub or bearing-ring and is also preferably beveled slightly to form a bearing for the end of the roller $d$ at or near its periphery. These retaining-rings $c^5$ and $c^6$ are held in position and the parts are connected together by locking nuts or rings $c^7$ and $c^8$, which screw into the hubs or outer bearings and contact with said retaining-rings. The retaining-ring $c^6$ is formed with an inner projecting flange $c^9$, which projects inwardly beyond the end of the conical sleeve $c'$, the locking-ring $c^8$ being of larger internal diameter, while the retaining-ring $c^5$ is of larger internal diameter than the large end of the conical sleeve $c$ and the locking-ring $c^7$ of smaller internal diameter than said conical sleeve, so that an inwardly-projecting flange is formed at the front and rear, respectively, of the conical sleeves $c$ and $c'$, so that said parts are held against displacement in the hub or outer bearing-rings. The hub or outer bearing-ring $c^2$ is fitted into the recess formed by the projecting annular flange $a^7$, and, with the retaining-ring $c^7$, which stands substantially flush with the end of said bearing-ring, has a bearing against the felt or fibrous washer $b$, placed in said recess, the internal diameter of the retaining-ring $c^7$ being slightly larger than the shouldered bearing-surface $a^4$, thus forming a joint at the rear end of the bearing that is practically impervious to water or dirt.

At the front end of the spindle I provide an adjusting-nut $e$, which is screwed onto the screw-threaded portion $a^2$ and preferably chambered out, as shown at $e'$, at the front end, and contacts with the end of the conical sleeve $c'$. There is screwed into this adjusting-nut $e$ an adjusting-screw $e^2$, the threads of which are cut in the opposite direction to the threaded portion $a^2$ of the spindle, the end of said adjusting-screw being adapted to contact with the end of the spindle, and thus form with the threaded portion of said spindle a locking-nut as well as an adjusting-screw, which holds the parts firmly in their position. By turning the adjusting-screw $e^2$ out or in the adjusting-nut will adjust the conical sleeve $c'$ out or in on the straight portion $a^3$ of the spindle.

Surrounding the adjusting nut and screw is a cap $f$, which has a flange $f'$, screw-threaded and adapted to be screwed into the outer end of the outer hub or bearing-ring $c^3$, said cap being notched out to receive the retaining-ring $c^8$, so that the end of the cap will stand flush with the inside of the locking-ring $c^8$, and thus firmly secure said ring, as well as the retaining-ring $c^6$, in position. The cap $f$ is further preferably provided with a screw-plug $f^3$ in the end thereof, which may be removed when occasion requires for oiling the bearing.

The conical rings $c$ and $c'$ are fitted snugly to the respective parts of the spindle on which they bear, but are not otherwise secured thereto. By having the straight portion $a^3$ the sleeve $c'$ may be adjusted back or forth, and thus adjust the space in which the rollers travel, while at the same time, the bearing portion of the spindle on which the conical sleeve is journaled being tapered, both of said sleeves may be readily removed from the spindle with the wheel or hub, the tapered seat for said sleeve permitting the same to readily clear the spindle the moment it is loosened by the slightest longitudinal movement.

The rollers $d$ may be placed loose in the tapered channel formed between the bearing-surface, or they may be formed with trunnions or supporting-axles $d'$, adapted to fit in the supporting-rings $d^2$ and $d^3$. In this latter case the retaining-rings $c^5$ and $c^6$ are notched or recessed, as shown at $b^4$, to receive the supporting-rings $d^2$, while the end of said retaining-rings bear against the shoulder in the outer bearing-ring or hub and against the ends of the rollers $d$ the same as before.

It will be seen that by the constructions described I provide a bearing which may be readily adjusted and in which the spindle may be removed from the hub or wheel at any time without interfering with the bearings proper, the parts being capable of perfect adjustment, and when in their operative positions are substantially dust and water proof.

Having thus described my invention, I claim—

1. In a roller-bearing, an axle, a tapered or inclined sleeve thereon, a hub surrounding said sleeve and having an inclined bearing-face adjacent to said sleeve, tapered or conical rollers between said cone and bearing-surface, a retaining-ring shouldered into said hub having an inclined surface to engage the ends of said rollers, and a projecting flange of smaller diameter than the conical sleeve, a locking-ring screwed into said hub to engage said retaining-ring, and a nut or cap also screwed into said hub and recessed to receive said locking-ring, substantially as specified.

2. The combination with the outer hub and an inner conical sleeve, of tapered rollers between said hub and sleeve, a retaining-ring for said rollers, a locking-ring screwed into said hub to engage said retaining-ring, a cap screwed into said hub and recessed to receive said locking-ring, an adjusting-nut lying wholly within said cap, said nut being screw-threaded on the axle and adapted to engage said conical sleeve, and a set-screw in said adjusting-nut having threads formed in opposition to the threads on said axle and adapted to contact with the end of said axle, substantially as specified.

3. In a roller-bearing, a tapered spindle or axle formed at its outer end with a plain straight portion and a screw-threaded portion, sleeves arranged on the straight and tapered portions of said axle respectively, a hub having bearing-faces surrounding said sleeves, and rollers between said sleeve and hub, inwardly-projecting retaining-rings arranged in each end of said hub and having smaller interior diameters than the ends of said sleeves, and a screw-threaded nut on the end of said axle, substantially as and for the purpose specified.

4. The combination with the inner tapered sleeve and the outer tapered hub, of the tapered rollers between said sleeve and hub, said rollers being journaled in a supporting-ring, a retaining-ring fitted into said hub and adapted to contact with the ends of said rollers, said retaining-ring being recessed to form a shoulder to engage the end of said rollers, and chambered for said supporting-ring, substantially as specified.

5. The combination with the conical sleeve, a hub surrounding the same, of tapered rollers between said hub and sleeve, a supporting-ring for said rollers, a retaining-ring notched out to receive said supporting-ring and having a shoulder to engage the ends of said rollers, a locking-ring screwed into said hub so as to lock said retaining-ring and conical sleeve in said hub, substantially as specified.

6. The combination with a journal or axle having a flanged collar thereon, a hub projecting into said collar, a washer of fibrous material within said flanged collar, a locking-ring fitted substantially flush in the end of said hub, said locking-ring being of a slightly-larger diameter than the diameter of said journal, and means for holding said hub on said spindle or journal, substantially as specified.

7. The combination with the tapered spindle having a shouldered plain portion with a flanged collar thereon, of a tapered sleeve fitted to the tapered portion of said spindle adjacent to the shouldered portion thereof, a hub having inclined surfaces adjacent to said tapered sleeve, said hub being fitted into the projecting flange of said collar, a retaining-ring in said hub to engage said rollers, a locking nut or ring substantially flush with the end of said hub to engage said retaining-ring and thus hold said retaining-ring and said conical sleeve in said hub, and means for holding said hub on said spindle or journal, substantially as specified.

8. The combination with the tapered spindle having the plain straight and screw-threaded portions at one end and a shouldered straight bearing-surface at the other end of conical sleeves mounted respectively on the plain straight surface at one end and on the tapered surface adjacent to the shouldered bearing at the opposite end, a hub having inclined bearing-surfaces, and rollers between said bearing-surfaces and sleeves, retaining-rings for said rollers, locking-rings for said retaining-rings, a screw-threaded nut on said spindle adapted to engage the end of one of said cones, a set-screw in said nut, and a screw-threaded cap over said nut, said cap being screwed into the end of said hub, and recessed to receive the locking-ring in said hub, substantially as specified.

In testimony whereof I have hereunto set my hand this 27th day of February, A. D. 1897.

ARTHUR W. GRANT.

Witnesses:
   CHAS. I. WELCH,
   G. M. GRIDLEY.